United States Patent
Zhang et al.

(10) Patent No.: US 12,112,450 B2
(45) Date of Patent: Oct. 8, 2024

(54) METHOD FOR COMPUTING, COMPUTING DEVICE, AND COMPUTER-READABLE STORAGE MEDIUM

(71) Applicant: Shanghai Biren Technology Co., Ltd, Shanghai (CN)

(72) Inventors: YuFei Zhang, Shanghai (CN); Zhu Liang, Shanghai (CN); ChengKun Sun, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 385 days.

(21) Appl. No.: 17/692,198

(22) Filed: Mar. 11, 2022

(65) Prior Publication Data
US 2022/0292632 A1    Sep. 15, 2022

(30) Foreign Application Priority Data
Mar. 12, 2021   (CN) .......................... 202110267756.2

(51) Int. Cl.
*G06T 3/4023*    (2024.01)
*G06T 5/50*    (2006.01)

(52) U.S. Cl.
CPC .............. *G06T 3/4023* (2013.01); *G06T 5/50* (2013.01)

(58) Field of Classification Search
CPC .................................. G06T 3/4023; G06T 5/50
See application file for complete search history.

(56) References Cited

U.S. PATENT DOCUMENTS

| | | | | |
|---|---|---|---|---|
| 2005/0010108 A1* | 1/2005 | Rahn | ..................... | G06T 11/005 |
| | | | | 382/128 |
| 2011/0254847 A1* | 10/2011 | Au | ........................ | G06T 3/4023 |
| | | | | 345/428 |
| 2019/0164254 A1* | 5/2019 | Tu | ............................ | G06T 3/40 |

FOREIGN PATENT DOCUMENTS

| | | | | |
|---|---|---|---|---|
| CN | 112991142 A | * | 6/2021 | ............. G06F 17/16 |
| GB | 2470611 A | * | 12/2010 | ............... G06T 1/60 |

\* cited by examiner

*Primary Examiner* — Pinalben Patel
(74) *Attorney, Agent, or Firm* — JCIP GLOBAL INC.

(57) ABSTRACT

A method for computing, a computing device, and a computer-readable storage medium are provided. The method includes determining a first pixel block in a cache. The first pixel block is composed of a 2m row×2n column pixel matrix and includes original pixel data and pixel data related to the original pixel data. The first pixel block is read from the cache. At least part of the pixel data related to the original pixel data is used for padding related to the original pixel data. The original pixel data includes pixel data from the $(n+1)^{th}$ column to the $2n^{th}$ column in the $(m+1)^{th}$ row to the $2m^{th}$ row in the $2m$ row×2 n column pixel matrix. When reading data from the cache, pixel data that needs to be obtained after insert-zero and padding operations on the original pixel data in back propagation can be read at one time.

10 Claims, 5 Drawing Sheets

300

310
Determine a first pixel block in a cache, wherein the first pixel block is composed of a 2m row×2n column pixel matrix and includes original pixel data and pixel data related to the original pixel data 320
Read the first pixel block from the cache

METHOD FOR COMPUTING, COMPUTING DEVICE, AND COMPUTER-READABLE STORAGE MEDIUM

CROSS-REFERENCE TO RELATED APPLICATION

This application claims the priority benefit of China application serial no. 202110267756.2, filed on Mar. 12, 2021. The entirety of the above-mentioned patent application is hereby incorporated by reference herein and made a part of this specification.

BACKGROUND

Technical Field

Embodiments of the disclosure generally relate to the field of artificial intelligence, and more particularly to a method for computing, a computing device, and a computer-readable storage medium.

Description of Related Art

Padding pixel data often occurs in image processing or deep neural networks based on artificial intelligence. For example, in the deep neural network, before processing pixel data, a padding operation is usually performed on original pixel data. In an example, padding of an original image may be implemented through adding additional pixels around boundaries of the original pixel data to be processed.

In the weight gradient computation of the back propagation, it is often necessary to use, for example, padding in the horizontal direction and/or padding in the vertical direction to obtain padded pixel data.

SUMMARY

The disclosure provides a method for computing, a computing device, and a computer-readable storage medium capable of providing a cache for computation.

According to a first aspect of the disclosure, a method for computing is provided. The method includes the following steps. A first pixel block is determined in a cache. The first pixel block is composed of a 2m row×2n column pixel matrix and includes original pixel data and pixel data related to the original pixel data, where m and n are positive integers. The first pixel block is read from the cache. At least part of the pixel data related to the original pixel data is used for padding related to the original pixel data, and the original pixel data includes pixel data from the $(n+1)^{th}$ column to the $2n^{th}$ column in the $(m+1)^{th}$ row to the $2m^{th}$ row in the 2m row×2n column pixel matrix.

According to a second aspect of the disclosure, a computing device is also provided. The computing device includes at least one processing unit and at least one memory. The at least one memory is coupled to the at least one processing unit and stores an instruction for execution by the at least one processing unit. When the instruction is executed by the at least one processing unit, the computing device executes the steps of the method according to the first aspect.

According to a third aspect of the disclosure, a computer-readable storage medium is also provided. The computer-readable storage medium stores a computer program. When the computer program is executed by a machine, the method according to the first aspect of the disclosure is executed.

In some embodiments, the method further includes the following steps. P rows are determined from the 2m rows of the 2m row×2n column pixel matrix based on a coordinate in a vertical direction indicated by a padding configuration related to the original pixel data to obtain a p row×2n column pixel matrix. Q columns are determined from the 2n columns of the determined p row×2n column pixel matrix based on a coordinate in a horizontal direction indicated by the padding configuration to obtain a p row×q column pixel matrix, where p and q are positive integers. An insert-zero operation is performed on the p row×q column pixel matrix to expand the p row×q column pixel matrix to a 2p row×2q column pixel matrix.

In some embodiments, the 2m rows are 4 rows, and the step of determining the p rows from the 2m rows of the 2m row×2n column pixel matrix includes the following. In response to the coordinate in the vertical direction indicated by the padding configuration being +3 or +2, the $2^{nd}$ row and the $3^{rd}$ row are selected from the 4 rows of a 4 row×2n column pixel matrix to obtain a 2 row×2n column pixel matrix. In response to the coordinate in the vertical direction indicated by the padding configuration being +1 or 0, the $3^{rd}$ row and the $4^{th}$ row are selected from the 4 rows of the 4 row×2n column pixel matrix to obtain the 2 row×2n column pixel matrix.

In some embodiments, the 2n columns are 8 columns, and the step of determining the q columns from the 2n columns of the determined p row×2n column pixel matrix includes the following. In response to the coordinate in the horizontal direction indicated by the padding configuration being 0 or +1, the $5^{th}$ column to the $8^{th}$ column are selected from the 8 columns of the 2 row×2n column pixel matrix to obtain a 2 row×4 column pixel matrix. In response to the coordinate in the horizontal direction indicated by the padding configuration being +2 or +3, the $4^{th}$ column to the $7^{th}$ column are selected from the 8 columns of the 2 row×2n column pixel matrix to obtain the 2 row×4 column pixel matrix.

In some embodiments, the step of performing the insert-zero operation on the p row×q column pixel matrix includes the following. A row of zeros is inserted into every other row of the p row pixel matrix. A column of zeros is inserted into every other column of the q column pixel matrix to obtain the 2p row×2q column pixel matrix.

In some embodiments, the method further includes the following step. The padding configuration is determined based on a size of a filter related to the original pixel data.

In some embodiments, the 2m row×2n column pixel matrix is a 4 row×8 column pixel matrix.

In some embodiments, an original pixel matrix is the 2 row×4 column pixel matrix.

In some embodiments, the pixel data related to the original pixel data includes pixel data from the $1^{st}$ column to the $2n^{th}$ column in the $1^{st}$ row to the $m^{th}$ row and pixel data from the $1^{st}$ column to the $n^{th}$ column in the $(m+1)^{th}$ row to the $2m^{th}$ row in the 2m row×2n column pixel matrix.

It should be understood that what is described in this section is not intended to identify key or critical features of embodiments of the disclosure, nor is it intended to limit the scope of the disclosure. Other features of the disclosure will become readily understood from the following description.

BRIEF DESCRIPTION OF THE DRAWINGS

The accompanying drawings are used for better understanding of the disclosure and do not constitute a limitation to the disclosure.

In the drawings, the same or similar reference numerals are used to refer to the same or similar elements.

DETAILED DESCRIPTION OF DISCLOSED EMBODIMENTS

Exemplary embodiments of the disclosure are described below with reference to the accompanying drawings, which include various details of the embodiments of the disclosure to facilitate understanding and should be considered as exemplary only. Therefore, persons skilled in the art should understand that various changes and modifications can be made to the embodiments described herein without departing from the scope and spirit of the disclosure. Also, for clarity and conciseness, description of known functions and structures are omitted from the following description.

In the description of the embodiments of the disclosure, terms such as "including" and the like should be understood as open-ended inclusion, that is, "including but not limited to". The term "based on" should be understood as "at least partially based on". The term "an embodiment" or "the embodiment" should be understood as "at least one embodiment". Terms such as "first" and "second" may refer to different or the same objects. Other explicit and implicit definitions may also be included below.

As mentioned above, before processing pixel data, it is usually necessary to perform padding on original pixel data. In an example, additional pixels may be added around boundaries of an input original image to generate a padding block to pad the original image. In addition, in the weight gradient computation of the back propagation, it is usually necessary to use, for example, padding in the horizontal direction and/or padding in the vertical direction to obtain padded pixel data.

In addition, in a deep neural network, during a computation of a forward propagation, when filtering is performed with a stride size of 2, the size of activation pixel data during the forward pass becomes half the size of the original image as output. Specifically, for example, when sampling an original image and the size of the original image is a 56 row×56 column pixel matrix, one pixel point is taken every other pixel point, so that a sampled 28 row×28 column pixel matrix will be output. In other words, since the manner of taking every other point is adopted (that is, taking a row every other row and taking a column every other column), a 28 row×28 column image is obtained. Thus, during the sampling process, the original image is halved in both length and height. After such steps, correspondingly, during a computation of a back propagation, the previously saved image composed of the sampled 28 row×28 column pixel matrix needs to be restored to the image of the 56 row×56 column pixel matrix, which requires the saved activation pixel data to be expanded through inserting a row of zeros into every other row and inserting a column of zeros into every other column, so as to expand the previously saved image composed of the 28 row×28 column pixel matrix to the image of the 56 row×56 column pixel matrix.

In addition, as mentioned above, before processing a pixel block, a padding operation also needs to be performed. For example, in an example, a column of pixel data may be padded to the left of the pixel block to be processed. In another example, a row of pixel data may be padded to the top of the pixel block to be processed. In addition, two rows of pixel block may also be padded to the top of the pixel block to be processed and two columns of pixel block is also padded to the left.

Figure 1:
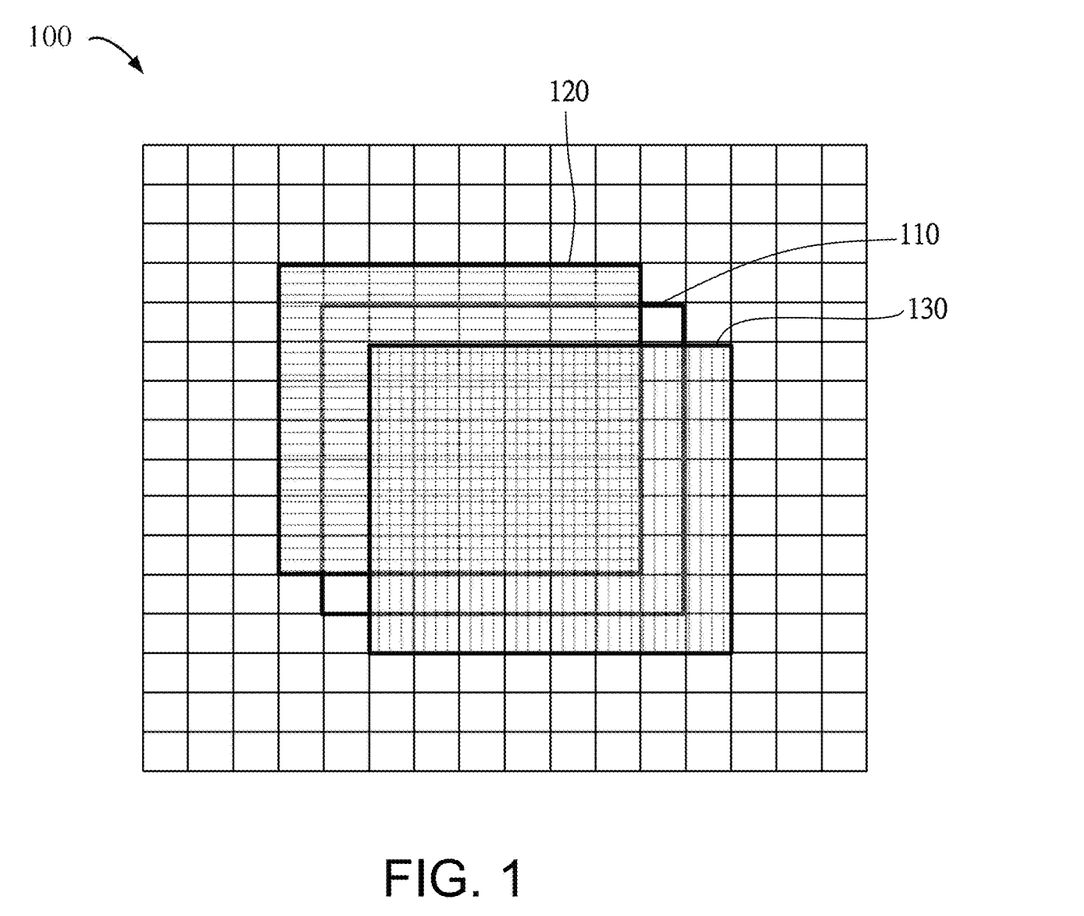
FIG. 1 is a schematic diagram of a conventional pixel block with different padding configurations.

FIG. 1 is a schematic diagram of a conventional pixel block with different padding configurations. Before introducing FIG. 1, the concepts of tiling and pixel blocks used during a tiling process will be briefly introduced first, so as to facilitate the understanding of FIG. 1. Tiling is a common technique used for data processing. Performing the tiling process once is to process a certain amount of pixel data. For example, when performing image processing, a hardware may process 64 pixel data of one pixel block at a time.

As shown in FIG. 1, one such pixel block of original pixel data 110 to be processed may include an 8 row×8 column pixel matrix. When padding, the pixel block with a certain padding configuration (+x,+y) of the original pixel data 110 may be obtained through translating by x in the horizontal direction and translating by y in the vertical direction with a position where the original pixel data 110 is located as the origin.

For example, as shown in FIG. 1, a pixel block 120 with a padding configuration (+1,+1) of the original pixel data 110 is translated leftward by 1 in the horizontal direction and is translated upward by 1 in the vertical direction with the position of the original pixel data 110 as the origin to obtain an 8 row×8 column pixel block with the padding configuration. In other words, during a weight gradient computation process, for the original pixel data 110, what actually needs to be obtained is the pixel data included the pixel block (for example, the pixel block 120 or a pixel block 130) with a certain padding configuration of the original pixel data (for example, the pixel block 110). Therefore, in order to obtain the pixel data of the pixel block 120 or 130, it is not only necessary to obtain a part of the pixel data from the original pixel data 110 (that is, the data of a part of the pixel block 110 that overlaps with the pixel block 120 in FIG. 1), but also necessary to obtain, for example, some pixel data from positions next to the original pixel data 110, that is, a part of the pixel data in the upper row and the left column of the original pixel data 110.

In another example, the pixel block 130 with a padding configuration (−1,−1) of the original pixel data 110 is translated rightward by 1 in the horizontal direction (that is, translated leftward by −1) and is translated downward by 1 in the vertical direction with the position of the original pixel data 110 as the origin to obtain an 8×8 pixel block with the padding configuration. In other words, during the weight gradient computation process, for the original pixel data 110, what actually needs to be obtained is the pixel data included in the pixel block (for example, the pixel block 130) with a certain padding configuration of the original image (for example, the pixel block 110). In this way, in order to obtain the pixel data in the pixel block 120, it is not only necessary to obtain a part of the pixel data from the original pixel data 110 (that is, the data of the part of the pixel block 110 that overlaps with the pixel block 130 in FIG. 1), but also necessary to obtain, for example, some pixel data from positions next to the original pixel data 110, that is, a part of the pixel data in the lower row and the right column of the original pixel data 110. Thereby, the padded pixel block with a certain padding configuration is obtained.

In summary, during the computation of the back propagation, it is necessary to perform two operations of inserting zero and padding on the saved activation pixel data. However, in conventional solutions, dedicated hardware is usually used to read required pixel data through using multiple read instructions. For example, if the overhead of a target pixel block to be read is 4 row×4 column pixel data, a 5 row×5 column, 6 row×6 column, or 7 row×7 column pixel matrix is required. Thus, when using the dedicated hardware, a buffer is used, and the pixels are read to the buffer. However, such approach requires dedicated hardware, is usually expensive, and is also relatively complex.

As such, in view of the above-mentioned issues to be solved, the embodiments of the disclosure provide a method for computing, which aims to at least partially solve the above-mentioned issues. In the solution of the disclosure, a first pixel block is first determined in a cache. The first pixel block is composed of a 2m row×2n column pixel matrix and includes original pixel data and pixel data related to the original pixel data. Then, the first pixel block is read from the cache. At least part of the pixel data related to the original pixel data is used for padding related to the original pixel data, and the original pixel data includes pixel data from the $(n+1)^{st}$ column to the $2n^{th}$ column in the $(m+1)^{th}$ row to the $2m^{th}$ row in the 2m row×2n column pixel matrix. Thereby, when reading data from the cache, the pixel data that needs to be obtained after performing the insert-zero operation and the padding operation on the original pixel data in the back propagation can be read at one time, and thus, after the pixel data are read to, for example, the buffer, the pixel data for processing may be obtained only by adding logic related to the insert-zero operation and the padding operation, thereby avoiding the need to read the related pixel data through using the solution of the complex hardware overhead, thereby reducing system power consumption and improving system performance.

The embodiments of the disclosure will be described in detail below with reference to FIG. 2 to FIG. 6.

Figure 2:
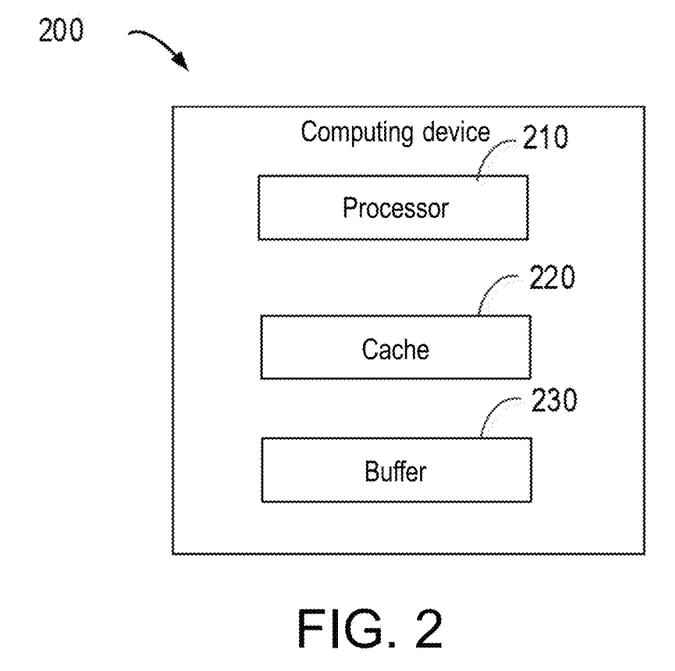
FIG. 2 is a schematic diagram of a computing device in which some embodiments of the disclosure can be implemented.

FIG. 2 is a schematic diagram of a computing device 200 in which various embodiments of the disclosure can be implemented. As shown in FIG. 2, the computing device 200 includes at least a processor 210, a cache 220, and a buffer 230. In an example, the computing device 200 may be used for, for example, a chip. In another example, the computing device 200 may be used for graphics processing unit (GPU) accelerated neural network computation. Alternatively, the computing device 200 may be used for a vector processor, other types of data computing unit, or other computing units for artificial intelligence.

The processor 210 is used to process a pixel block loaded from the cache 220. In an embodiment, the processor 210 may be a general matrix multiply (GEMM) unit. In other embodiments, the processor 210 may be other types of processors, and the scope of the disclosure is not limited in this regard. In an example, the size of the loaded pixel block may be 4×8. It should be understood that the size of the loaded pixel block may be any size, and the scope of the disclosure is not limited in this regard.

The cache 220 is used to cache data. In an example, the cache 220 may cache an original image or original pixel data for convolution. In another example, the cache 220 may cache an original image or original pixel data for the weight gradient computation of the back propagation. In an example, the cache 220 may include multiple cache lines, wherein each cache line may have a virtual address, so that the processor 210 may use the virtual address to load data from the cache line.

The buffer 230 may be used to store data, for example, to store a pixel block. The pixel block may be a pixel block composed of original pixel data or a pixel block with a certain padding configuration. For example, the processor 210 in the computing device 200 may read/load pixel block(s) from the cache 220 and store the pixel block(s) into the buffer 230 for the processor 210 to process the pixel block(s).

Figure 3:
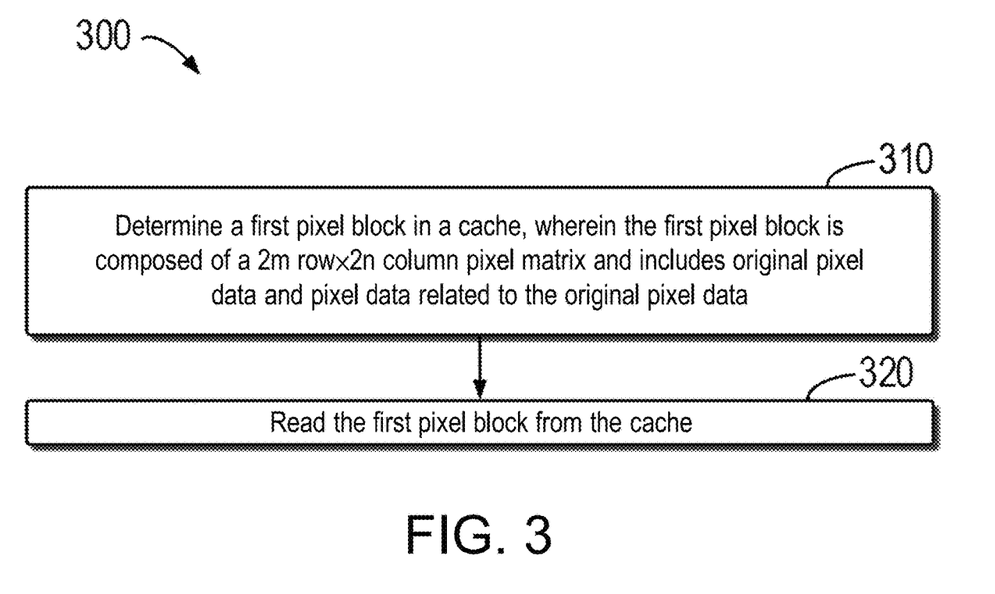
FIG. 3 is a flowchart of a method for computing according to an embodiment of the disclosure.
Figure 4:
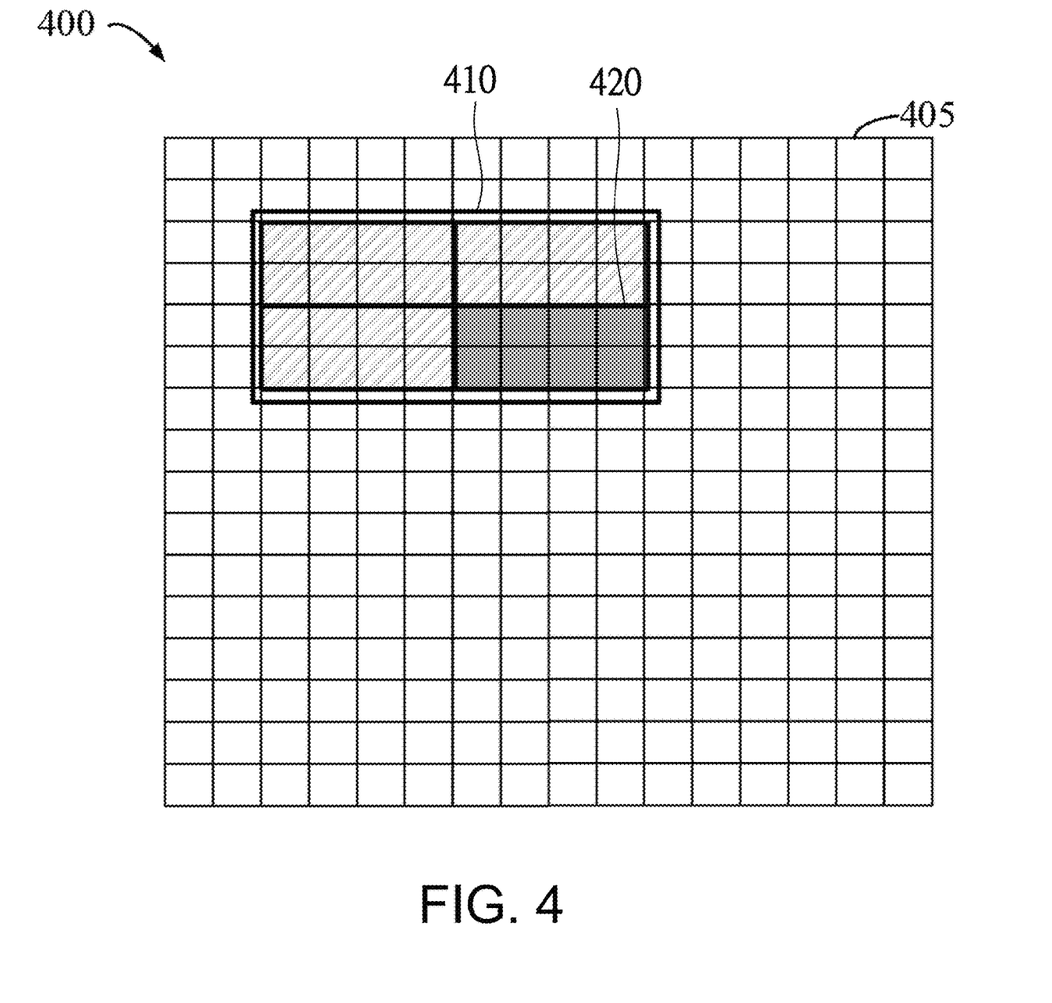
FIG. 4 is a schematic diagram of loading pixel blocks according to some embodiments of the disclosure.

A method for computing according to an embodiment of the disclosure will be described below with reference to FIG. 3 and in conjunction with FIG. 4. FIG. 3 is a flowchart of a method for computing according to an embodiment of the disclosure. It should be understood that a method 300 may include additional components and actions not shown and/or may omit the shown components and actions, and the scope of the disclosure is not limited in this regard. FIG. 4 is a schematic diagram of loading pixel blocks according to some embodiments of the disclosure. It should be understood that FIG. 4 only shows an example of a schematic diagram of loading a pixel block set according to an embodiment of the disclosure. Although FIG. 4 only shows loading the pixel block set including two pixel blocks, it is understood that the pixel block set may include any number of pixel blocks, and the scope of the disclosure is not limited in this regard.

As shown in FIG. 3, in step 310, the computing device 200 determines the first pixel block in the cache 220. The first pixel block is composed of the 2m row×2n column pixel matrix and includes the original pixel data and the pixel data related to the original pixel data, where m and n are positive integers. For example, m=2 and n=4. It can be understood that m and n may be other positive integers, for example, m=3 and n=4, and the protection scope of the disclosure is not limited in this regard.

At least part of the pixel data related to the original pixel data is used for padding related to the original pixel data. Further, the original pixel data includes the pixel data from the $(n+1)^{th}$ column to the $2n^{th}$ column in the $(m+1)^{th}$ row to the $2m^{th}$ row in the 2m row×2n column pixel matrix.

In some embodiments, when padding is performed, the original pixel data may be padded based on different padding configurations. For example, the padding configurations may be (0,0), (0,+1), (0,+2), (0,+3), (+1,0), (+1,+1), (+1,+2), (+1,+3), (+2,0), (+2,+1), (+2,+2), (+2,+3), (+3,0), (+3,+1), (+3,+2), and (+3,+3). It can be understood that only examples related to the padding configuration are given above and the padding configuration may also be other configurations, and the protection scope of the disclosure is not limited in this regard.

Step 310 of FIG. 3 will be described in detail below with reference to FIG. 4. As shown in FIG. 4, a first pixel block 410 is a pixel block composed of a 4 row×8 column pixel matrix. In other words, the computing device 200 determines the pixel block 410 composed of the 4 row×8 column pixel matrix in the cache 220. The pixel block 410 includes original pixel data 420. The original pixel data is a 2 row×4 column pixel matrix, as shown in FIG. 4, which occupies pixel data from the $5^{th}$ column to the $8^{th}$ column in the $3^{rd}$ row to the $4^{th}$ row in the 4 row×8 column pixel matrix. In other words, the original pixel data 420 occupies the lower right corner part of the first pixel block 410 composed of the 4 row×8 column pixel matrix.

In some implementations, as shown in FIG. 4, the first pixel block 410 also includes pixel data related to the original pixel data, which may occupy parts of the first pixel block 410 other than the original pixel block 420. In other words, the pixel data related to the original pixel data may include pixel data from the $1^{st}$ column to the $8^{th}$ column in the $1^{st}$ row to the $2^{nd}$ row and pixel data from the $1^{st}$ column to the $4^{th}$ column in the $3^{rd}$ row to the $4^{th}$ row in the 4 row×8 column pixel matrix. In other words, the pixel data related to the original pixel data 420 occupies the left part (including the upper left part) and the upper right part of the first pixel block 410 composed of the 4 row×8 column pixel matrix.

It can be understood that in some embodiments, when multiple original pixel data 420 in an original image (for example, an entire image 405 in FIG. 4) need to be processed, pixel data adjacent to the original pixel data needs to be read from the cache 220 for padding.

In other embodiments, when the original pixel data 420 to be processed is at a boundary, for example, if the original pixel data 420 is located at the upper left corner of the original image 405, the original pixel data 420 will not have pixel data in one or more rows above and/or pixel data in one or more columns to the left for padding. Therefore, in such an embodiment, the original pixel data 420 to be processed may be padded through using an out of boundary (OOB) algorithm, padding with zero values, etc.

Return to FIG. 3 again. In step 320, the computing device 200 reads the first pixel block 410 from the cache 220. For example, the first pixel block 410 is read from the cache 220 to the buffer. In this way, when reading data from the cache, the pixel data that needs to be obtained after performing the insert-zero operation and the padding operation on the original pixel data in the back propagation can be read at one time, thereby reducing system power consumption and improving system performance.

In some embodiments, the computing device 200 may determine p rows from 2m rows of the 2m row×2n column pixel matrix based on a coordinate in the vertical direction indicated by the padding configuration related to the original pixel data to obtain a p row×2n column pixel matrix.

In some examples, when the 2m rows are 4 rows, and if the coordinate in the vertical direction indicated by the padding configuration is +3 or +2, the $2^{nd}$ row and the $3^{rd}$ row may be selected from the 4 rows of a 4 row×2n column pixel matrix to obtain a 2 row×2n column pixel matrix.

If the coordinate in the vertical direction indicated by the padding configuration is +1 or +0, the $3^{rd}$ row and the $4^{th}$ row may be selected from the 4 rows of the 4 row×2n column pixel matrix to obtain the 2 row×2n column pixel matrix.

In other embodiments, the computing device 200 may determine q columns from 2n columns of the determined p row×2n column pixel matrix based on a coordinate in the horizontal direction indicated by the padding configuration to obtain a p row×q column pixel matrix. In some embodiments, p and q may be positive integers.

In some embodiments, when the 2n columns are 8 columns, if the coordinate in the horizontal direction indicated by the padding configuration is 0 or +1, the $5^{th}$ column to the $8^{th}$ column may be selected from the 8 columns of a 2 row×8 column pixel matrix to obtain a 2 row×4 column pixel matrix.

If the coordinate in the horizontal direction indicated by the padding configuration is +2 or +3, the $4^{th}$ column to the $7^{th}$ column may be selected from the 8 columns of the 2 row×8 column pixel matrix to obtain the 2 row×4 column pixel matrix.

After the p row×q column (for example, 2 row×4 column) pixel matrix is obtained, the insert-zero operation is performed on the matrix to expand the p row×q column pixel matrix to a 2p row×2q column pixel matrix. In some specific examples, the computing device 200 may insert a row of zeros into every other row of the p row pixel matrix and may insert a column of zeros into every other column of the q column pixel matrix to obtain the 2p row×2q column pixel matrix. For example, when p=2 and q=4, the 2 row×4 column pixel matrix is expanded to the 4 row×8 column pixel matrix through the insert-zero operation.

FIG. 5A to FIG. 5D are respectively schematic diagrams of read results of pixel blocks with a certain padding configuration according to the disclosure. In other words, the computing device 200 may read a result of a corresponding pixel block after padding and the insert-zero operation from, for example, the buffer 230 through the method above.

Figure 5A:
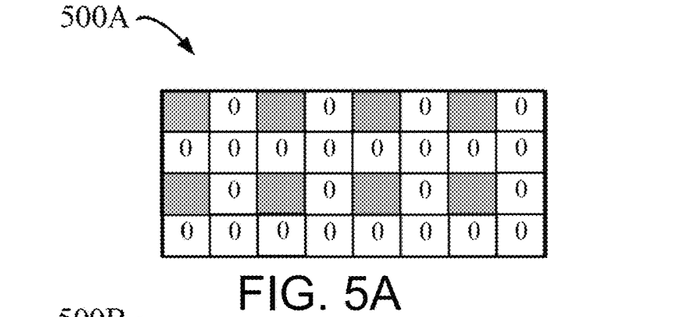
FIG. 5A to FIG. 5D are respectively schematic diagrams of read results of pixel blocks with a certain padding configuration according to the disclosure.

FIG. 5A shows the result of reading a pixel block with a padding configuration (0,0). In the example, the original pixel data is 2 rows×4 columns, so the first pixel block with the size shown in FIG. 4 is read from the cache. In addition, since the coordinate of the padding configuration in the vertical direction is 0, the $3^{rd}$ row and the $4^{th}$ row are selected from the 4 rows of the 4 row×8 column pixel matrix to obtain the 2 row×8 column pixel matrix. Then, since the coordinate in the horizontal direction indicated by the padding configuration is 0, the $5^{th}$ column to the $8^{th}$ column are selected from the 8 columns of the 2 row×8 column pixel matrix obtained above to obtain the 2 row×4 column pixel matrix. Therefore, after the 2 row×4 column pixel matrix is obtained, the insert-zero operation is performed on the matrix to expand the 2 row×4 column pixel matrix to the 4 row×8 column pixel matrix. In other words, a row of zeros is inserted into every other row of the 2 row pixel matrix (that is, a row of zeros is inserted below a first row of the pixel matrix and a row of zeros is inserted below a second row of the pixel matrix). In addition, a column of zeros is inserted into every other column of the 4 column pixel matrix (that is, a column of zeros is respectively inserted to the right of a first column, a second column, a third column, and a fourth column of the pixel matrix), so that the 2 row×4 column pixel matrix is expanded to the 4 row×8 column pixel matrix (as shown in an example 500A in FIG. 5A) for subsequent processing of pixel data.

Figure 5B:
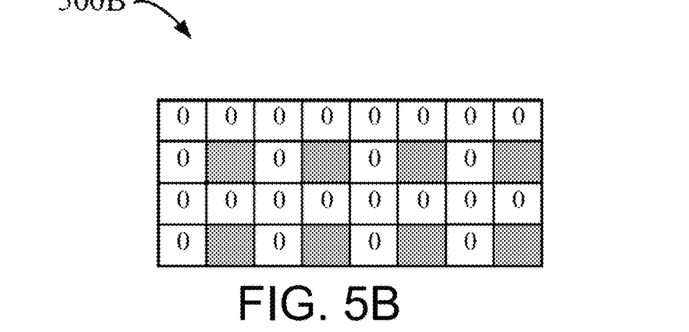

FIG. 5B shows the result of reading a pixel block with a padding configuration (+1,+1). In the example, the original pixel data is 2 rows×4 columns, so the first pixel block with the size shown in FIG. 4 is read from the cache. In addition, since the coordinate of the padding configuration in the vertical direction is +1, the $3^{rd}$ row and the $4^{th}$ row are selected from the 4 rows of the 4 row×8 column pixel matrix to obtain the 2 row×8 column pixel matrix. Then, since the coordinate in the horizontal direction indicated by the padding configuration is +1, the $5^{th}$ column to the $8^{th}$ column are selected from the 8 columns of the 2 row×8 column pixel matrix obtained above to obtain the 2 row×4 column pixel matrix. Therefore, after the 2 row×4 column pixel matrix is obtained, the insert-zero operation is performed on the matrix to expand the 2 row×4 column pixel matrix to the 4 row×8 column pixel matrix. In other words, a row of zeros is inserted into every other row of the 2 row pixel matrix (that is, a row of zeros is inserted above a first row of the pixel matrix and a row of zeros is inserted above a second row of the pixel matrix). In addition, a column of zeros is inserted into every other column of the 4 column pixel matrix (that is, a column of zeros is respectively inserted to the left of a first column, a second column, a third column, and a fourth column of the pixel matrix), so that the 2 row×4 column pixel matrix is expanded to the 4 row×8 column pixel matrix (as shown in an example 500B in FIG. 5B) for subsequent processing of pixel data.

Figure 5C:
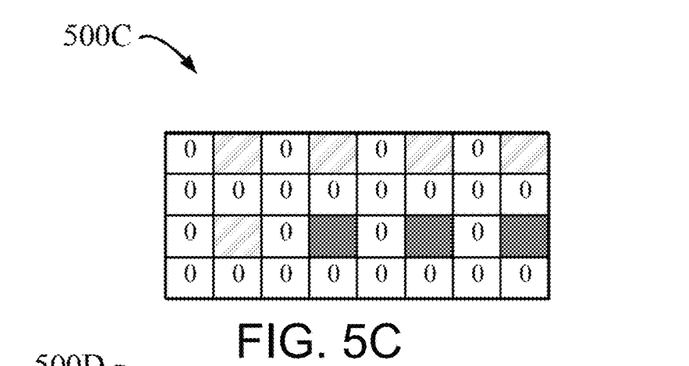

FIG. 5C shows the result of reading a pixel block with a padding configuration (+3,+2). In the example, the original pixel data is 2 rows×4 columns, so the first pixel block with the size shown in FIG. 4 is read from the cache. In addition, since the coordinate of the padding configuration in the vertical direction is +3, the $2^{nd}$ row and the $3^{rd}$ row are selected from the 4 rows of the 4 row×8 column pixel matrix to obtain the 2 row×8 column pixel matrix. Then, since the coordinate in the horizontal direction indicated by the padding configuration is +2, the $4^{th}$ column to the $7^{th}$ column are selected from the 8 columns of the 2 row×8 column pixel matrix obtained above to obtain the 2 row×4 column pixel matrix. Therefore, after the 2 row×4 column pixel matrix is obtained, the insert-zero operation is performed on the matrix to expand the 2 row×4 column pixel matrix to the 4 row×8 column pixel matrix (as shown in an example 500C in FIG. 5C) for subsequent processing of pixel data.

Figure 5D:
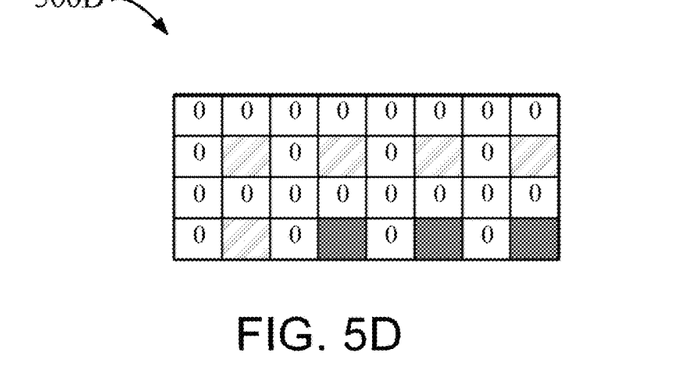

FIG. 5D shows the result of reading a pixel block with a padding configuration (+3,+3). In the example, the original pixel data is 2 rows×4 columns, so the first pixel block with the size shown in FIG. 4 is read from the cache. In addition, since the coordinate of the padding configuration in the vertical direction is +3, the $2^{nd}$ row and the $3^{rd}$ row are selected from the 4 rows of the 4 row×8 column pixel matrix to obtain the 2 row×8 column pixel matrix. Then, since the coordinate in the horizontal direction indicated by the padding configuration is +3, the $4^{th}$ column to the $7^{th}$ column are selected from the 8 columns of the 2 row×8 column pixel matrix obtained above to obtain the 2 row×4 column pixel matrix. Therefore, after the 2 row×4 column pixel matrix is obtained, the insert-zero operation is performed on the matrix to expand the 2 row×4 column pixel matrix to the 4 row×8 column pixel matrix (as shown in an example 500D in FIG. 5D) for subsequent processing of pixel data.

Figure 6:
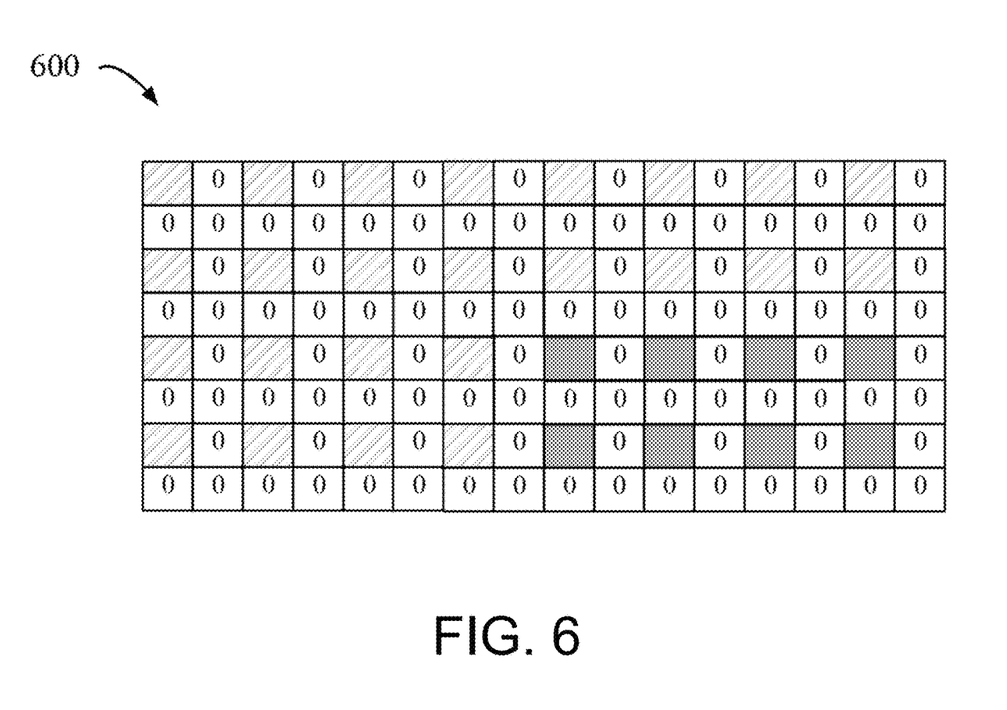
FIG. 6 is a schematic diagram of expanding a loaded pixel block according to some embodiments of the disclosure.

It can be understood that in another embodiment, after the first pixel block is read from the cache, the first pixel block may first be expanded (that is, the insert-zero operation). FIG. 6 is a schematic diagram of expanding a loaded pixel block according to some embodiments of the disclosure. Therefore, after obtaining the expanded first pixel block as shown in an example 600 in FIG. 6, according to the corresponding coordinate of the padding configuration, the corresponding 4 row×8 column pixel matrix is obtained, so as to be used for subsequent processing of pixel data. For example, when the padding configuration is (+3,+3), the pixel block composed of the pixel matrix shown as 500D may be obtained by translating upward by the position of three pixels, and then translating leftward by the position of three pixels with the upper left corner vertex in the original pixel data as the coordinate origin, so as to be used for subsequent processing of pixel data.

In some embodiments, one row among 4 rows of pixel data or one column among 8 columns of pixel data of the pixel block 410 occupies one entry of the buffer 230. In an example, when one row in a pixel block includes 8 pixels, data of 8 pixels is stored in the entry of the buffer 230. In another example, when one pixel may have p channels, and one row in a pixel block includes 8 such pixels, data of 8 pixels×64 channels is stored in one entry of, for example, the target buffer 230. In other words, the pixel data of the 8 pixels×64 channels occupies one entry of the target buffer 230.

As such, the computing device 200 may read the results shown in FIG. 5A to FIG. 5D from the buffer 230 based on the starting address of the buffer 230 of the first pixel block and the corresponding address offset (for example, the address offset associated with the padding configuration), and through the insert-zero operation.

It can be understood that the computing device 200 may also use other methods to read the results shown in FIG. 5A to FIG. 5D because the data related to padding required at this time has been loaded from the cache to, for example, the buffer 230 at one time for use by the computing device 200.

In some embodiments, the padding configuration may be determined based on the size of a filter related to the original pixel data. For example, when the size of the filter is 3×3, the padding configuration may be (+1,+1). In other examples, when the size of the filter is 5×5, the padding configuration may be (+2,+2). Alternatively, when the size of the filter is 7×7, the padding configuration may be (+3,+3).

It should be understood that the method 300 may be implemented as a computer software program, which may be tangibly contained in a machine-readable medium, such as a storage unit. In some embodiments, a part or all of the computer program may be loaded to and/or installed on the computing device 200 via a ROM and/or a communication unit. When the computer program is loaded to a RAM and executed by a processor, one or more actions of the method 300 may be executed.

The disclosure may be a method, a computing device, a computer storage medium, and/or a computer program product. The computer program product may include a computer-readable storage medium, which is loaded with a computer-readable program instruction for executing various aspects of the disclosure. The computer-readable storage medium may be a tangible device that may hold and store an instruction for use by an instruction execution device. The computer-readable storage medium may be, for example but not limited to, an electrical storage device, a magnetic storage device, an optical storage device, an electromagnetic storage device, a semiconductor storage device, or any suitable combination of the above.

The computer program instruction for executing the operation of the disclosure may be an assembly instruction, an instruction set architecture (ISA) instruction, a machine instruction, a machine-related instruction, a microcode, a firmware instruction, state setting data, or a source code or an object code written in any combination of one or more programming languages. In some embodiments, an electronic circuit, such as a programmable logic circuit, a field programmable gate array (FPGA), or a programmable logic array (PLA), may be personalized and customized through using state information of the computer-readable program instruction. The electronic circuit may execute the computer-readable program instruction to implement various aspects of the disclosure.

The flowchart and the block diagram in the drawings illustrate the architecture, functionality, and operation of possible implementations of the system, the method, and the computer program product according to the embodiments of the disclosure. In this regard, each block in the flowchart or the block diagram may represent a module, a program segment, or a part of an instruction. The module, the program segment, or a part of the instruction contains one or more executable instructions for implementing a specified logical function. In some alternative implementations, the functions noted in the blocks may also occur in an order different from the order noted in the drawings. For example, two consecutive blocks may actually be executed substantially concurrently or may sometimes be executed in the reverse order, depending upon the functionality involved. It is also noted that each block of the block diagram and/or the flowchart and the combination of blocks in the block diagram and/or the flowchart may be implemented by a dedicated hardware-based system that may execute the specified function or action, or may be implemented by a combination of dedicated hardware and computer instructions.

It should be understood that steps may be reordered, added, or deleted using the various forms of procedures shown above. For example, the steps described in the disclosure may be executed concurrently, sequentially, or in different orders, and no limitation is imposed herein as long as the desired result of the technical solution in the disclosure can be implemented.

The above-mentioned specific implementations do not constitute a limitation on the protection scope of the disclosure. Persons skilled in the art should understand that various modifications, combinations, sub-combinations, and substitutions may be performed according to design requirements and other factors. Any modifications, equivalent replacements, and improvements made within the spirit and principle of the disclosure should be included within the protection scope of the disclosure.

What is claimed is:

1. A method for computing, comprising:
    determining a first pixel block in a cache, wherein the first pixel block is composed of a 2m row×2n column pixel matrix and comprises original pixel data and pixel data related to the original pixel data, where m and n are positive integers, at least part of the pixel data related to the original pixel data is used for padding related to the original pixel data, and the original pixel data comprises pixel data from an $(n+1)^{th}$ column to a $2n^{th}$ column in an $(m+1)^{th}$ row to a $2m^{th}$ row in the 2m row×2n column pixel matrix; and
    reading the first pixel block, having a padding configuration related to the original pixel data, from the cache, comprising:
        determining p rows from 2m rows of the 2m row×2n column pixel matrix based on a coordinate in a vertical direction indicated by the padding configuration to obtain a p row ×2n column pixel matrix;
        determining q columns from 2n columns of the determined p row×2n column pixel matrix based on a coordinate in a horizontal direction indicated by the padding configuration to obtain a p row×q column pixel matrix, where p and q are positive integers;
        performing an insert-zero operation on the p row×q column pixel matrix to expand the p row×q column pixel matrix to a 2p row×2q column pixel matrix.

2. The method according to claim 1, wherein the 2m rows are 4 rows, and determining the p rows from the 2m rows of the 2m row×2n column pixel matrix comprises:
    in response to the coordinate in the vertical direction indicated by the padding configuration being +3 or +2, selecting a $2^{nd}$ row and a $3^{rd}$ row from 4 rows of a 4 row×2n column pixel matrix to obtain a 2 row×2n column pixel matrix; and
    in response to the coordinate in the vertical direction indicated by the padding configuration being +1 or 0, selecting a $3^{rd}$ row and a $4^{th}$ row from the 4 rows of the 4 row×2n column pixel matrix to obtain the 2 row×2n column pixel matrix.

3. The method according to claim 2, wherein the 2n columns are 8 columns, and determining the q columns from the 2n columns of the determined p row×2n column pixel matrix comprises:
    in response to the coordinate in the horizontal direction indicated by the padding configuration being 0 or +1, selecting a $5^{th}$ column to an $8^{th}$ column from 2n columns of the 2 row×2n column pixel matrix to obtain a 2 row×4 column pixel matrix; and
    in response to the coordinate in the horizontal direction indicated by the padding configuration being +2 or +3, selecting a $4^{th}$ column to a $7^{th}$ column from the 2n columns of the 2 row×2n column pixel matrix to obtain the 2 row×4 column pixel matrix.

4. The method according to claim 1, wherein performing the insert-zero operation on the p row×q column pixel matrix comprises:
    inserting a row of zeros into every other row of the p row pixel matrix; and
    inserting a column of zeros into every other column of the q column pixel matrix to obtain the 2p row×2q column pixel matrix.

5. The method according to claim 1, further comprising:
    determining the padding configuration based on a size of a filter related to the original pixel data.

6. The method according to claim 1, wherein the 2m row×2n column pixel matrix is a 4 row×8 column pixel matrix.

7. The method according to claim 1, wherein the original pixel matrix is a 2 row×4 column pixel matrix.

8. The method according to claim 1, wherein the pixel data related to the original pixel data comprises pixel data from a $1^{st}$ column to a $2n^{th}$ column in a $1^{st}$ row to an $m^{th}$ row and pixel data from a $1^{st}$ column to an $n^{th}$ column in an $(m+1)^{th}$ row to a $2m^{th}$ row in the 2m row×2n column pixel matrix.

9. A computing device, comprising:
    at least one processing unit; and
    at least one memory, coupled to the at least one processing unit and storing an instruction for execution by the at least one processing unit, wherein when the instruction is executed by the at least one processing unit, the computing device executes steps of the method according to claim 1.

10. A non-transitory computer-readable storage medium, storing a computer instruction, wherein the computer instruction is used for a computer to execute the method according to claim 1.

* * * * *